Aug. 12, 1941.  S. S. GREEN  2,252,483
DAMPING UNIT FOR WATT-HOUR METERS
Filed Nov. 21, 1938  2 Sheets-Sheet 1
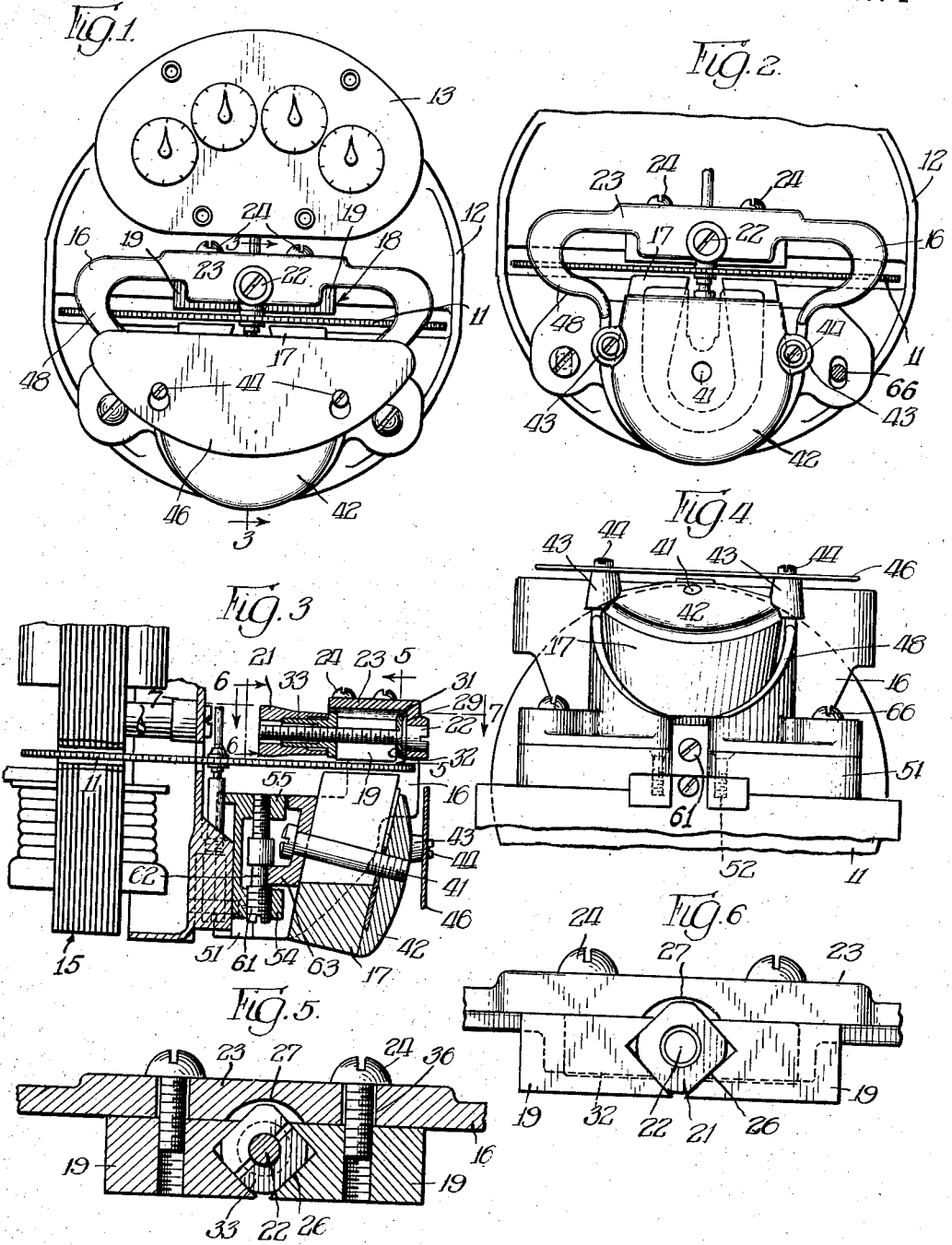
INVENTOR.
Stanley S. Green,
BY Louis Robertson
ATTORNEY.

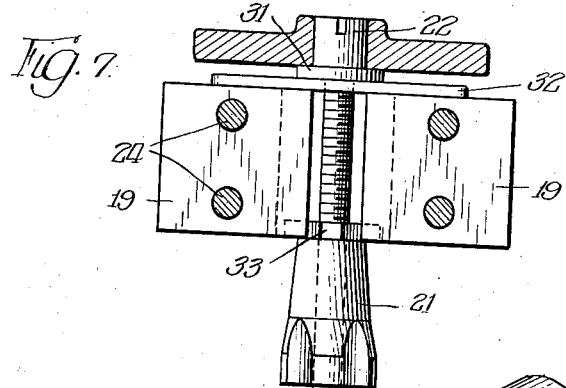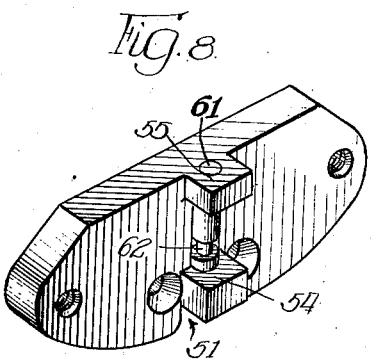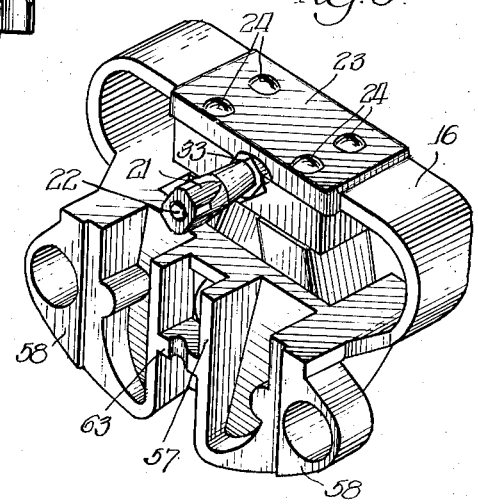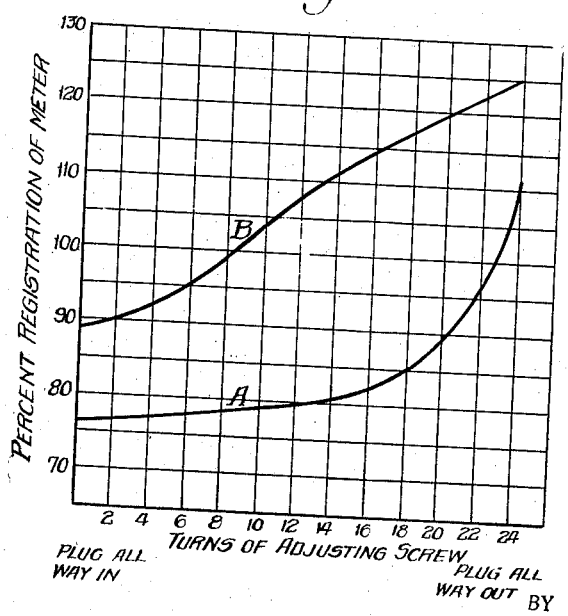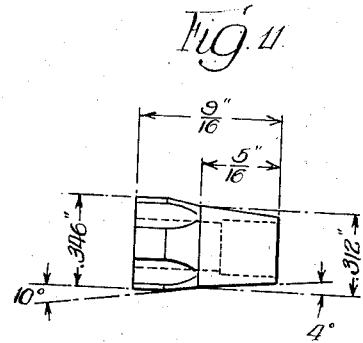

Patented Aug. 12, 1941

2,252,483

UNITED STATES PATENT OFFICE 2,252,483

DAMPING UNIT FOR WATT-HOUR METERS

Stanley S. Green, Lafayette, Ind., assignor to Duncan Electric Manufacturing Company, Lafayette, Ind., a corporation of Illinois Application November 21, 1938, Serial No. 241,592

23 Claims. (Cl. 171—34)

Electric meters of the type installed by utility companies in homes and offices, for example, are known as watt-hour meters. The rotating disc of such a meter is in effect the rotor of a small electric motor, being driven inductively by an electromagnetic driving unit. A very small driving force would rotate the disc very fast except that the disc is retarded to a speed proportional to the power consumption in the measured circuit by rotating through the field of one or more permanent magnets.

Although the retarding or damping force of a given magnetic field is proportional to the speed of the disc, the damping units which produce this field are initially adjusted to vary the field, so as to make the speed of the disc bear a predetermined relationship to the power consumption. It is by this variation of the magnetic field that meters are commonly adjusted for accuracy, this adjustment being called the full-load adjustment. Increasing the strength of the field reduces the speed of the disc, and vice versa.

In recent years I have made a number of improvements in damping units. In my copending application Serial No. 37,669 (Patent No. 2,149,-287, issued March 7, 1939), I disclosed a new mounting for a pair of damping magnets and also introduced new principles in the adjustment thereof, one of the most important of which was the principle of micrometric adjustment of field strength by ordinary screw-driver action from the front of the meter, with this adjustment comprising the sole adjustment and being maintained in spite of a temporary removal of the damping unit from the meter. In a later application now Patent No. 2,110,418, I disclosed the efficient use of a single small magnet of high coercive metal with its poles adjacent one face of the disc and an armature opposite the poles adjacent the other face of the disc for completing the magnetic circuit through the disc in both directions. It is important to have the magnetic flux pass through the disc in both directions at closely spaced points in order to get the maximum damping efficiency. In later applications copending with the application of said Patent No. 2,110,418 and with the present application, I have disclosed various simple but satisfactory means for adjusting this type of a damping system. In another copending application Serial No. 190,724, now Patent No. 2,206,887, I have disclosed the feature of providing means for centering the disc within the gap of the damping magnet system.

According to the present invention I have provided a new damping unit construction which combines various features of these prior applications and also includes some entirely new features. This new damping unit is very simple and economical to manufacture and its performance, especially with respect to adjustment, is exceptionally satisfactory. The chief improvement with respect to adjustment performance is in obtaining an approximately straight-line adjustment curve so that throughout the range of ordinary adjustments a given turn of the adjustment screw will always have approximately the same adjusting effect.

As in my previous constructions, the adjustment is substantially free from backlash, although the means for obtaining this freedom is different in the present instance. Likewise, as in previous constructions, the damping unit may be removed from the meter (in this instance from the main frame which carries the disc) without disturbing its adjustment. Furthermore, a gap centering adjustment is provided which, as in my previous disclosure of such an adjustment, does not vary the length of the gap within the magnetic system but merely varies its positioning with respect to the disc.

From the foregoing the objects of the invention will be apparent for the most part but additional objects and advantages of the invention will be evident from the following description and from the drawings, in which:

Fig. 1 is a front view of a meter mechanism embodying the form of the present invention chosen for the purpose of illustration.

Fig. 2 is a fragmentary and partly sectional view corresponding to Fig. 1 but with certain portions removed for the sake of clarity.

Fig. 3 is a fragmentary vertical sectional view taken approximately on the line 3—3 of Fig. 1.

Fig. 4 is a fragmentary bottom view of Fig. 1.

Fig. 5 is a fragmentary sectional view taken approximately on the line 5—5 of Fig. 3.

Fig. 6 is a fragmentary view taken approximately on the line 6—6 of Fig. 3.

Fig. 7 is a view of the armature and associated flange taken approximately on the line 7—7 of Fig. 3.

Fig. 8 is a perspective view showing the front of the bracket on which the damping unit slides.

Fig. 9 is a perspective view showing the back of the damping unit.

Fig. 10 is a graph showing the adjustment curve for the illustrated plug and the corresponding adjustment curve for a plug of uniform cross section.

Fig. 11 is a side view of the plug showing possible dimensions.

Although this invention may take numerous forms, only one has been chosen for the purpose of illustration. In this form the invention has been illustrated in conjunction with a watt-hour meter including a disc 11 carried by a main frame 12 and driven by an electromagnet driving unit 15. The disc 11 will of course be geared to any suitable indicating device such as the register 13. The damping unit of this invention includes an auxiliary frame 16, a permanent magnet 17 secured thereto, and an armature indicated generally by the reference numeral 18. The magnet 17 is of horseshoe shape with both of its poles adjacent the underside of the disc 11. The armature comprises a pair of magnetic blocks 19 and a magnetic plug 21 which can be slid in and out between them and is operated by an adjusting screw 22.

The blocks 19 may conveniently be secured to the upper portion 23 of the frame 16 by means of screws 24, there preferably being two screws to each block 19. The adjacent ends of the blocks 19 and V-shaped grooves 26 therein and the support portion 23 is recessed as seen at 27 in Fig. 5. The plug 21 moves within the space thus provided.

The screw 22 is journaled in a flange 29 of the support portion 23 in the manner shown in Fig. 3. Thus, the slotted head of the screw 22 is exposed through a hole in the flange 29, and an annular flange or collar 31 at the base of the head of the screw rests against the flange 29. The screw is held in this position by a retaining member such as a leaf spring 32 which prior to insertion is somewhat bowed so that when it is approximately flattened as seen in Fig. 7 it will urge the collar 31 against the flange 29. The screw 22 and spring 32 are of course inserted before the blocks 19 since these blocks hold the spring 32 in place. The resiliency of the spring 32 overcomes any looseness of the fitting of the parts and presses the collar 31 firmly against the flange 29 at all times, thus eliminating backlash at this point.

Backlash between the screw 22 and the plug 21 is eliminated by virtue of a split sleeve 33, the outer threaded portion of which resiliently grips the threaded portion of the screw 22. The rear or inner portion of the sleeve 33 is solid and is driven into the plug 21 so that there is no play between these two members. The head of the sleeve 33 is generally in the form of a square except for having its corners rounded so as not to protrude below the blocks 19. It will be observed from Fig. 6 that the rear end of the plug is of substantially the same size and shape. The result is that when the blocks 19 are so positioned as to engage the head of the sleeve 33 smoothly they will also engage or approximately engage the large end of the plug 21 when the plug is entirely within the space between the blocks 19. This has the desirable result of making the maximum flow of flux through the plug 21 fairly high, even though it may not be quite as high as it would be with a solid armature.

It will be observed that the screws 24 for securing the blocks 19 pass through slightly oversize holes 36 in the support portion 23. This permits the blocks 19 to accommodate themselves to the plug 21 so that accurate machining of the parts is not necessary. If the surfaces are slightly irregular, relatively little force applied to the screw 22 will, if necessary, force the blocks 19 infinitesimally farther apart so as to leave the path of the plug 21 unobstructed. In other words, the plug 21 can act as a wedge in moving between the blocks 19 to force them apart if they are too close or if they are unevenly positioned.

The magnet 17 is secured to the auxiliary frame 16 by means of a screw 41. As seen in Fig. 3, this screw may be applied from the rear of the auxiliary frame 16 before the frame is applied. This avoids the danger of thoughtlessly loosening the screw 41 in inspecting or adjusting the meter. The screw 41 may screw into a nonmagnetic nut 42 which in the illustrated form of the invention is a die-cast plate having lugs 43 thereon, as seen best in Fig. 4. Screws 44 are threaded into these lugs for mounting a name plate 46. The auxiliary frame 16 may include the curved flange portions 48 which not only serve as braces for rigidifying this entire frame unit but also form a sort of a cradle for the magnet 17 so that this magnet will be less likely to be dropped in handling at any time when the screw 41 is loosened.

The efficiency of a given damping unit depends in part upon the shortness or narrowness of the air gaps through which the disc rotates. The reason for this is that a longer gap increases the reluctance of the path through the disc and hence causes less magnetic flux to flow through this path. With a wide gap there would be more leakage flux passing from pole to pole of the magnet without passing through the disc. The general practice therefore is to use fairly narrow gaps in damping units. Narrow gaps for a rotating disc might cause difficulty if the disc were not sufficiently centered within the gap. In manufacturing the various parts of a meter on a large scale, it is of course impossible to get all similar parts exactly alike and it takes very careful manufacturing practice and hence added expense to get the parts sufficiently alike so that there will be no trouble due to the use of a narrow gap. According to the present invention a simple construction is provided for centering the disc in the gap.

According to the present invention the centering of the disc in the gaps of the damping magnet unit are accomplished by vertically adjusting the damping unit. To this end the auxiliary frame 16 is vertically slidable on a bracket 51 which may be considered as a part of the main frame 12 even though it is separable therefrom and is normally secured thereto by screws 52. The interfitting portions of the bracket 51 and the auxiliary or damping frame 16 are best seen in Figs. 8 and 9. As seen in Fig. 8, the front side of the bracket 51 is substantially smooth except for the provision of the vertically spaced lugs 54 and 55. The rear side of the damping frame 16 is provided with a complemental vertical slideway comprising the walls 57 between which the lugs 54 and 55 fit snugly. The only contact of the frame 16 with the face of the bracket 51 is preferably adjacent the widely spaced lateral ends of the bracket 51 where the slide surfaces 58 are provided. These widely spaced slide surfaces prevent wabbling of the damping frame 16 on the bracket 51.

The vertical adjustment of the damping frame 16 is accomplished by means of a screw 61 which is inserted through the lug 54 and threaded into the lug 55. This screw is provided with an annular groove 62 which engages a complementally slotted lug 63 formed between the walls 57. From Fig. 3 it is clear that as the screw 61 is rotated it will slide the damping frame 16 up or down due to the interengagement of the groove 62 with the lug 63. In this manner the screw can be turned in one direction or the other until the disc 11 is centered within the gap between the magnet 17 and the blocks 19. Once this centering adjustment has been completed, this damping unit may be rigidly secured in this proper position by screws 66 which pass through the slide surfaces 58 and screw into the bracket 51. If it should be necessary at any time to remove the damping unit, the screw 61 will insure its reapplication at the same level so that ordinarily no additional adjustment will be necessary.

From the foregoing it is seen that a simple damping unit is provided which combines the features of gap centering and removability without change of adjustment. Furthermore, the full load adjustment makes use of the front-micrometric-screwdriver adjustment principle and is substantially free from backlash so that the greatest possible convenience of adjustment may be obtained.

An additional feature which is important in providing the greatest ease of adjustment is in having the amount of adjustment produced by a given turn of the screw fairly uniform throughout the range of adjustment and particularly in the portion of the range more commonly used and to have the rapidity of adjustment such as to facilitate delicate adjustments without unduly retarding greater adjustments. If a plug of uniform cross section were used in place of the plug 21, its adjustment curve would be similar to the curve A of Fig. 10. From this curve it is seen that with such a plug, the adjustment produced by a complete turn of the adjustment screw would be in the neighborhood of ¼% with the plug nearly all the way in, and, with the plug nearly all the way out, the adjustment provided by one turn of the screw would be in the neighborhood of 10%. At one end of the range the change is too gradual and too many turns would be necessary to accomplish a given degree of adjustment, while at the other end of the range the change is too great and it would be rather difficult to turn the adjustment screw a small enough amount to make a very minor or delicate adjustment.

According to the present invention the plug 21 has been especially shaped to straighten out the adjustment curve. The adjustment curve of the plug 21 is shown at B in Fig. 10. From this curve it is seen that in screwing the plug from all the way out to within about three turns of all the way in, the rate of adjustment is almost constant, namely around 2% or 2½% a turn for each turn of the screw. Even in the last three turns, which are not often used, the rate of adjustment is still fairly good. This relatively straight curve is produced by the varied cross section of the plug 21. In general it is seen from Fig. 3 that it is of reducing cross section from the end remote from the blocks 19 to the end which is normally between the blocks 19 or from the remote end to the near end, as this could be expressed more easily. However, a uniform taper would not produce a curve as straight as that shown. For aid in producing a plug, the dimensions shown in Fig. 11 are given, although they are to be regarded as examples rather than as limitations since wide departures may be made therefrom while still utilizing the principle of this invention. The taper on the near or smaller end of the plug is about 4° and the length of this portion of the plug is $\frac{5}{16}$ of an inch. Furthermore, this portion of the plug is round in cross section. It should be noted that in speaking of reduced cross section the question of whether the central portion of the cross section is solid is relatively unimportant, the more important fact being the proximity of the plug to the blocks 19, assuming that the absolute cross section of the plug (i. e., deducting the cross section of the hole therein) is sufficient to carry the necessary flux on an efficient portion of its permeability curve.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A damping magnet system for rotating discs, including magnet means having opposed poles adapted to lie adjacent one face of a disc, and armature means positioned opposite said poles and adapted to lie adjacent the other face of the disc including a pair of spaced blocks and a plug movable in the space between said blocks and to a position at least partly removed from between said blocks, said plug being specially shaped with a smaller cross section at one end than at the other to cause its adjusting effect to be more uniform for successive equal movements than if the plug were of uniform cross section.

2. A damping magnet assembly for rotating discs, including a main frame carrying a meter disc, a non-magnetic auxiliary frame adapted to straddle the disc, magnet means secured to said auxiliary frame and having opposed poles adapted to lie adjacent one face of the disc, an armature secured to a remote part of the auxiliary frame, positioned opposite the poles and adapted to lie adjacent the other face of the disc, an adjusting plug of magnetic material forming part of said armature and adjustable with respect to the auxiliary frame for varying the flux density in the armature, and means for removably securing the damping assembly including said auxiliary frame, magnet means and armature to the main meter frame in a manner to permit removal and replacement of said assembly while maintaining its adjustment.

3. A meter including a main frame, a disc rotatably carried thereby, a damping magnet assembly for retarding said disc including a non-magnetic frame adapted to straddle the disc, magnet means secured to said frame and having opposed poles adapted to lie adjacent one face of the disc, an armature secured to a remote part of the frame, positioned opposite the poles and adapted to lie adjacent the other face of the disc, an adjusting plug forming part of said armature and adjustable with respect to the remainder of the armature for varying its permeance, and means for securing said frame to the main frame including a bracket adapted to be fixed to one of said frames and slidably secured to the other and a screw for adjusting the relative positions of the slidable frames for centering the disc between the magnet poles and the armature.

4. A watt-hour meter including a main frame, a disc rotatably carried by the frame, an inductive unit for acting on the disc secured to the frame and having a gap through which the disc rotates, said frame member and said inductive unit being relatively shiftable in a direction perpendicular to the plane of the disc and having interengaging formations thereon for limiting their relative movement to said direction, and screw means operable by axial movement thereof, as it is turned, for micrometrically and self-lockingly adjusting the relative positions of said inductive unit and said frame for centering the disc within the gap.

5. A watt-hour meter including a main frame, a disc rotatably carried by the frame, an inductive unit for acting on the disc secured to the frame and having a gap through which the disc rotates, said frame member and said inductive unit being relatively shiftable in a direction perpendicular to the plane of the disc and having interengaging formations thereon for limiting their relative movement to said direction, and screw means for micrometrically adjusting the relative positions of said inductive unit and said frame for centering the disc within the gap, said screw means extending between and being journaled in spaced portions of the interengaging formations on one of the relatively shiftable parts and intermediate said portions having an actuating engagement with the other of said relatively shiftable parts.

6. A meter including a main frame, a disc rotatably carried by the frame, means tending to rotate the disc, and a damping unit for the disc including a one piece non-magnetic damping frame straddling the disc, a permanent magnet secured to the frame on one side of the disc and having its poles adjacent one face of the disc, an armature secured to the damping frame on the other side of the disc and positioned opposite said poles adjacent the other face of the disc, lateral extensions on said damping frame forming widely spaced support arms adapted to be secured to the main frame and to slide thereon, and guide and adjusting means intermediate said spaced arms comprising vertically spaced lugs on one frame member slidably fitting within a groove in the other frame member, an annularly grooved screw threaded in one of said lugs and journaled in the other, and a slotted lug formed within said groove for removably engaging the slot of said screw.

7. A watt-hour meter including a main frame, a disc rotatably carried by the frame, means for rotating the disc, a damping unit including an auxiliary frame carried by the main frame and adapted to retard the disc, and combination screw and guide means associated with said frames and comprising a pair of vertically spaced lugs on one frame member slidably fitting within a groove in the other frame member, an annularly grooved screw threaded in one of said lugs and journaled in the other, and a slotted lug formed within said groove for removably engaging the slot of said screw.

8. Damping means for a rotatable disc, including a frame adapted to straddle the disc, magnet means secured to the frame and having closely spaced opposed poles adapted to be positioned adjacent one face of the disc approximately equidistant from the axis thereof, and an armature adapted to be positioned opposite said poles adjacent the other face of the disc, said armature including a pair of spaced magnetic blocks each opposite one of said poles, a magnetic plug movable to a position substantially between said blocks and to a position less between said blocks, and screw means for moving said plug and accurately positioning it.

9. Damping means for a rotatable disc, including a frame adapted to straddle the disc, magnet means secured to the frame and having closely spaced opposed poles adapted to be positioned adjacent one face of the disc approximately equidistant from the axis thereof, an armature adapted to be positioned adjacent the other face of the disc and opposite said poles, said armature including a magnetic plug movable to a position substantially within said armature and to a more external position and screw means for moving said plug and accurately positioning it, said frame having a securing portion to which said armature is secured and having a flange extending perpendicularly thereto with a hole formed in said flange, and said screw having a head portion journaled in said hole and a flange at the base of said head bearing against the flange of said frame, and a spring bearing against said armature and against the flange on said screw.

10. Damping means for a rotatable disc, including a frame adapted to straddle the disc, magnet means secured to the frame and having closely spaced opposed poles adapted to be positioned adjacent one face of the disc approximately equidistant from the axis thereof, and an armature adapted to be positioned adjacent the other face of the disc and opposite said poles, said armature including a magnetic plug movable to a position substantially within said armature and to a more external position and screw means for moving said plug and accurately positioning it including a screw journaled to said frame and a sleeve having a solid end portion driven into said plug and having its other end portion threaded and split and resiliently engaging said screw.

11. Damping means for a rotatable disc, including a frame adapted to straddle the disc, magnet means secured to the frame and having closely spaced opposed poles adapted to be positioned adjacent one face of the disc approximately equidistant from the axis thereof, and an armature adapted to be positioned adjacent the other face of the disc and opposite said poles, said armature including a magnetic plug movable to a position substantially within said armature and to a more external position and screw means for moving said plug and accurately positioning it including a screw journaled to said frame and a sleeve having a solid end portion driven into said plug and having its other end portion threaded and split and resiliently engaging said screw, said plug and sleeve having a generally rectangular outer cross section and engaging correspondingly shaped surfaces of the armature to prevent turning of said plug as said screw is turned.

12. Damping means for a rotatable disc, including a frame adapted to straddle the disc, magnet means secured to the frame and having closely spaced opposed poles adapted to be positioned adjacent one face of the disc approximately equidistant from the axis thereof, and an armature adapted to be positioned adjacent the other face of the disc and opposite said poles, said armature including a magnetic plug movable to a position substantially within said armature and to a more external position and screw means for moving said plug and accurately positioning it including a screw journaled to said frame and a sleeve having a solid end portion driven into said plug and having its other end portion threaded and split and resiliently engaging said screw, said plug and sleeve having a generally rectangular outer cross section and engaging correspondingly shaped surfaces of the armature to prevent turning of said plug as said screw is turned; the corresponding surfaces of the armature being V-shaped to engage adjacent sides of the plug and maintain its alinement.

13. A watt-hour meter damping unit comprising magnetic circuit means of magnetic metal forming a narrow air gap therein adapted to receive a rotatable disc and forming a control gap between two closely spaced portions thereof adapted to receive a magnetic control member, and including a permanent magnet, each of said gaps having flux passing therethrough which has traversed substantially the full length of the permanent magnet, and a magnetic control member movable generally longitudinally into and from the control gap, having its portion entering the control gap specially shaped with a cross section progressively decreasing in width toward the end last leaving the gap to cause its control effect to be more uniform for successive equal movements than if this portion were of uniform cross section.

14. A watt-hour meter damping unit comprising magnetic circuit means of magnetic metal forming a narrow air gap therein adapted to receive a rotatable disc and forming a control gap between two magnetic portions thereof, and including a permanent magnet, each of said gaps having flux from said magnet passing therethrough, and said circuit means including a magnetic control member carrying flux which passes through the control gap and movable with respect to at least one of the magnetic portions forming said control gap to vary the reluctance of said control gap, said control member and the associated gap-forming portion being adjacent one another in one position and so shaped that upon successive equal movements of the control member through a major portion of its range of movement the faces will be separated progressively further apart at varying rates according to a predetermined schedule designed to produce approximately uniform effects per unit of control member movement.

15. An armature assembly for damping units, including a support, a pair of magnetic blocks movably secured to flat surfaces thereon and having generally V-shaped slots in their adjacent faces, a plug movably positioned between said blocks and shaped to fit snugly within said slots, and screw means for moving said plug with sufficient force to spread said blocks apart if they are positioned to obstruct said plug.

16. A watt-hour meter including a main frame, a disc rotatably carried by the frame, a damping unit carried by the frame, having a gap through which the disc rotates and including means for adjusting its damping effect, and gap centering means for adjusting the position of the unit on the frame to center the disc within the gap; said unit being removable from the frame while both of said adjustments are maintained constant.

17. A watt-hour meter including a rotatably mounted disc, electromagnetic means for driving the disc, a damping unit for the disc including a permanent magnet system producing a pair of closely spaced opposed fields passing through the disc, and screw-operated adjustment means including a magnetic member movable to vary the reluctance of the path of the magnet system therethrough, and comprising the sole means for varying the damping effect of the damping unit, said adjustment means having sufficient movement and being so shaped as to vary said reluctance in such successive proportions as to vary the damping effectiveness of the damping unit by approximately equal amounts for equal movements of the operating screw through a range of adjustment sufficient to compensate for ordinary variations in the commercial manufacture of such meters.

18. A watt-hour meter mechanism of the general type including a driving unit, a frame secured to the driving unit, a disc rotatably carried by the frame, a damping magnet carried by the frame with opposed poles adjacent one face of the disc, and an armature carried by the frame adjacent the other face of the disc and opposite to the poles, characterized by the division of the armature into two relatively movable magnetic portions which overlap in the direction of the relative movement, but which are moved apart by said movement with a rate of surface separation less than the speed of movement, to form a substantial air gap in the path of the flux flowing through the armature.

19. A watt-hour meter including a base adapted to be mounted on a wall, and a meter mechanism carried by said base including a rotatable disc, damping magnet means having a pair of closely spaced opposed pole portions adjacent one face of said disc, a magnetic plug positioned in a path of flux of said magnet means and shiftable forwardly and rearwardly to have more or less of its body in an effective flux-carrying position in said path substantially bridging portions thereof adjacent the plug and alternatively separated from at least one of said portions by a substantial air gap, and screw means for moving said plug, said screw means being provided with a forwardly open slot and being operable from the front of the meter by rotation about a forwardly extending axis, and said magnetic plug and each of the magnetic portions on opposite sides of the plug in the path of flux having similarly shaped surfaces adjacent to one another over a substantial area to form a low reluctance path.

20. Damping means for a rotatable disc, including a frame adapted to straddle the disc, magnet means secured to the frame and having closely spaced opposed poles adapted to be positioned adjacent one face of the disc approximately equidistant from the axis thereof, an armature adapted to be positioned adjacent the other face of the disc and opposite said poles, said armature including a magnetic plug movable to a position substantially within said armature and to a more external position and screw means for moving said plug and accurately positioning it, said frame having a securing portion to which said armature is secured and having a flange extending perpendicularly thereto with a hole formed in said flange, and said screw having a head portion journaled in said hole and retained therein substantially free from longitudinal play.

21. A damping unit for watt-hour meters, including a base plate adapted to be removably secured to a conventional meter frame, an auxiliary frame carried by the base plate, and damping magnet means carried by the auxiliary frame and forming a gap adapted to receive a meter disc therein, said auxiliary frame being movable with respect to the base plate, having interengaging formations therewith confining it normally to movement in a vertical direction, and being removable therefrom, and means for moving the auxiliary frame with respect to the base plate, said means being unaffected by removal of the auxiliary frame from the base plate whereby the auxiliary frame may be replaced on the base plate in its previously adjusted position thereon.

22. A damping unit for watt-hour meters, including a plurality of members of magnetic metal, at least one of which is permanent, completing a magnetic circuit having two closely spaced air gaps therein, two of the magnetic members of said circuit being relatively adjustable by moving one substantially along and beyond a surface of the other, the surface of one of said two relatively movable members which is adjacent the other of said two members being shaped out of parallelism with the line of movement to produce an approximately uniform adjustment upon successive equal movements of the members throughout a major portion of the range of movement.

23. The combination of a damping magnet means formed of magnetic metal, including a permanent magnet, and forming a magnetic circuit having a narrow air gap therein adapted to receive a rotatable disc, a magnetic adjustment plug positioned a variable amount between two portions of the damping magnet means forming said circuit, and screw means for moving said plug, said plug and the faces of the magnet portions adjacent thereto being shaped with such variations longitudinally of the plug as to provide substantially uniform adjustment with successive equal longitudinal movements.

STANLEY S. GREEN.